United States Patent
Kim et al.

(10) Patent No.: US 9,172,910 B2
(45) Date of Patent: *Oct. 27, 2015

(54) APPARATUS FOR MULTI-PARTY VIDEO CALL, SERVER FOR CONTROLLING MULTI-PARTY VIDEO CALL, AND METHOD OF DISPLAYING MULTI-PARTY IMAGE

(71) Applicant: SAMSUNG SDS CO., LTD., Seoul (KR)

(72) Inventors: Chang Ho Kim, Seoul (KR); Jae Ho Yang, Anyang-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 87 days.

This patent is subject to a terminal disclaimer.

(21) Appl. No.: 14/067,291

(22) Filed: Oct. 30, 2013

(65) Prior Publication Data

US 2014/0118467 A1    May 1, 2014

(30) Foreign Application Priority Data

Oct. 31, 2012   (KR) .......................... 10-2012-0121799

(51) Int. Cl.
*H04N 7/15*    (2006.01)
(52) U.S. Cl.
CPC ...................................... *H04N 7/15* (2013.01)

(58) Field of Classification Search
CPC ........... H04N 7/15; H04N 7/152; H04N 7/14; H04N 7/141; H04N 7/147
USPC ............................................. 348/14.01–14.16
See application file for complete search history.

(56) References Cited

U.S. PATENT DOCUMENTS

| | | | |
|---|---|---|---|
| 2006/0158510 A1* | 7/2006 | Lia et al. .................... | 348/14.08 |
| 2007/0188596 A1* | 8/2007 | Kenoyer .................... | 348/14.08 |
| 2009/0015661 A1* | 1/2009 | King et al. ................ | 348/14.09 |
| 2012/0069132 A1* | 3/2012 | Kato .......................... | 348/14.02 |
| 2012/0249877 A1* | 10/2012 | Hernandez Costa et al. . | 348/564 |
| 2013/0027502 A1* | 1/2013 | Skramstad ................ | 348/14.01 |

* cited by examiner

*Primary Examiner* — Melur Ramakrishnaiah
(74) *Attorney, Agent, or Firm* — Sughrue Mion, PLLC

(57) ABSTRACT

Provided are an apparatus for a multi-party video call, a server for controlling a multi-party video call, and a method of displaying a multi-party image. The apparatus for a multi-party video call includes a receiver module configured to receive a composite image of multi-party video call participants from a server, an image separating module configured to separate images of the respective multi-party video call participants from the composite image received by the receiver module, and a display module configured to arrange the separated images according to a predetermined layout and display the separated images on a screen.

25 Claims, 12 Drawing Sheets

(a) (b) (c)

APPARATUS FOR MULTI-PARTY VIDEO CALL, SERVER FOR CONTROLLING MULTI-PARTY VIDEO CALL, AND METHOD OF DISPLAYING MULTI-PARTY IMAGE

CROSS-REFERENCE TO RELATED APPLICATION

This application claims priority to and the benefit of Republic of Korea Patent Application No. 10-2012-0121799, filed on Oct. 31, 2012, the disclosure of which is incorporated herein by reference in its entirety.

BACKGROUND

1. Field

The present disclosure relates to technology for a multi-party video call, and more particularly, to an apparatus for a multi-party video call, a server for controlling a multi-party video call, and a method of displaying a multi-party image.

2. Discussion of Related Art

The recent development of infocommunications technology has enabled a video call as well as a voice call through a portable terminal. In a video call service, users take their own images using cameras installed in portable terminals and then transmit the images to each other's portable terminals, so that they can communicate while looking at each other's faces.

A video call service can provide a one-to-one video call between a caller and a called party and a video call among multiple parties. Here, video calls among multiple parties are mainly made through a control device called a multipoint control unit (MCU). The MCU is a device that receives voices and images transmitted by respective portable terminals, combine the plurality of pieces of voices and images into one piece of voice and one image respectively, and then transmit the combined voice and image to the respective portable terminals. However, in case of an existing multi-party video call using the MCU, a portable terminal merely displays an image received through the MCU on a screen, and it is impossible to diversify the layout of a multi-party video call screen.

SUMMARY

The present disclosure is directed to providing a means for diversifying the layout of a screen displayed on a video call terminal as needed in a multi-party video call in which a multipoint control unit (MCU) is used.

According to an aspect of the present disclosure, there is provided an apparatus for a multi-party video call including: a receiver module configured to receive a composite image of multi-party video call participants from a server; an image separating module configured to separate images of the respective multi-party video call participants from the composite image received by the receiver module; and a display module configured to arrange the separated images according to a predetermined layout and display the separated images on a screen.

According to another aspect of the present disclosure, there is provided a method of displaying a multi-party image including: receiving, at a receiver module, a composite image of multi-party video call participants from a server; separating, at an image separating module, images of the respective multi-party video call participants from the composite image received by the receiver module; and arranging, at a display module, the separated images according to a predetermined layout and displaying the separated images on a screen.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to the accompanying drawings. However, the embodiments are merely examples and are not to be construed as limiting the present disclosure. When it is determined that the detailed description of known art related to the present disclosure may obscure the gist of the present disclosure, the detailed description thereof will be omitted. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
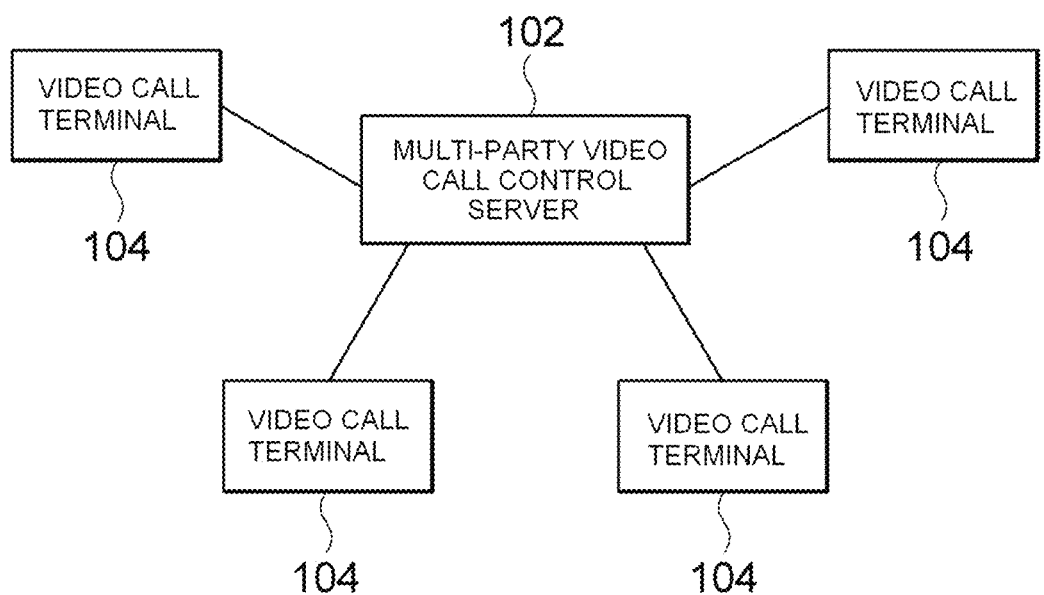
FIG. 1 is a block diagram illustrating a multi-party video call system according to an exemplary embodiment of the present disclosure.

FIG. 1 is a block diagram illustrating a multi-party video call system according to an exemplary embodiment of the present disclosure. As shown in the drawing, a multi-party video call system 100 according to an exemplary embodiment of the present disclosure includes a server 102 for controlling a multi-party video call and a plurality of video call terminals 104. Meanwhile, it is to be noted that a multi-party video call includes a call between two or more persons in the present disclosure.

The multi-party video call control server 102 is a server for controlling a video call between the plurality of video call terminals 104. The multi-party video call control server 102 includes a multipoint control unit (MCU). Using the MCU, the multi-party video call control server 102 receives images of video call participants from the respective plurality of video call terminals 104, and then transmits a composite image obtained by combining the received images to the respective video call terminals 104. For example, the multi-party video call control server 102 receives the images from the respective video call terminals 104, and successively stores the images in a buffer memory according to frames. Also, in case of need, the multi-party video call control server 102 may encode the received images using an appropriate video codec (e.g., H.264, etc.), convert the encoded images into real-time transport protocol (RTP) packets (RTP packetization), and then transmit the RTP packets to the respective video call terminals 104. However, this is merely an example, and the multi-party video call control server 102 may generate the composite image using various methods other than the aforementioned method, and transmit the composite image to the respective video call terminals 104.

The video call terminals 104 are used by video call participants who participate in a video call according to control of the multi-party video call control server 102. Each of the video call terminals 104 includes an image taking means for photographing a video call participant, and a display means for displaying an image of another video call participant. Specifically, the video call terminal 104 takes an image of the corresponding video call participant using the image taking means, and transmits the image to the multi-party video call control server 102. Also, the video call terminal 104 receives a composite image obtained by combining the images of the respective participants in the video call from the multi-party video call control server 102, separates the images of the respective multi-party video call participants from the received composite image, arranges the separated images according to a predetermined layout, and displays the separated images on a screen.

Figure 2:
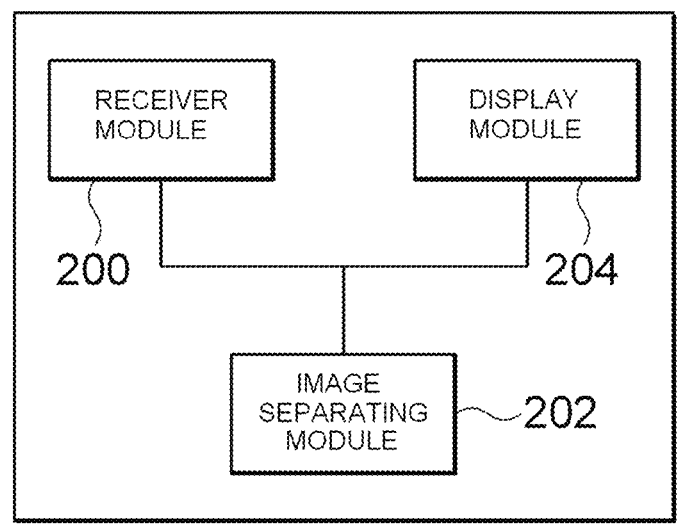
FIG. 2 is a block diagram showing a detailed constitution of a video call terminal according to an exemplary embodiment of the present disclosure.

FIG. 2 is a block diagram showing a detailed constitution of a video call terminal according to an exemplary embodiment of the present disclosure. As shown in the drawing, a video call terminal 104 according to an exemplary embodiment of the present disclosure includes a receiver module 200, an image separating module 202, and a display module 204.

The receiver module 200 receives a composite image of multi-party video call participants from a multi-party video call control server 102.

Figure 3:
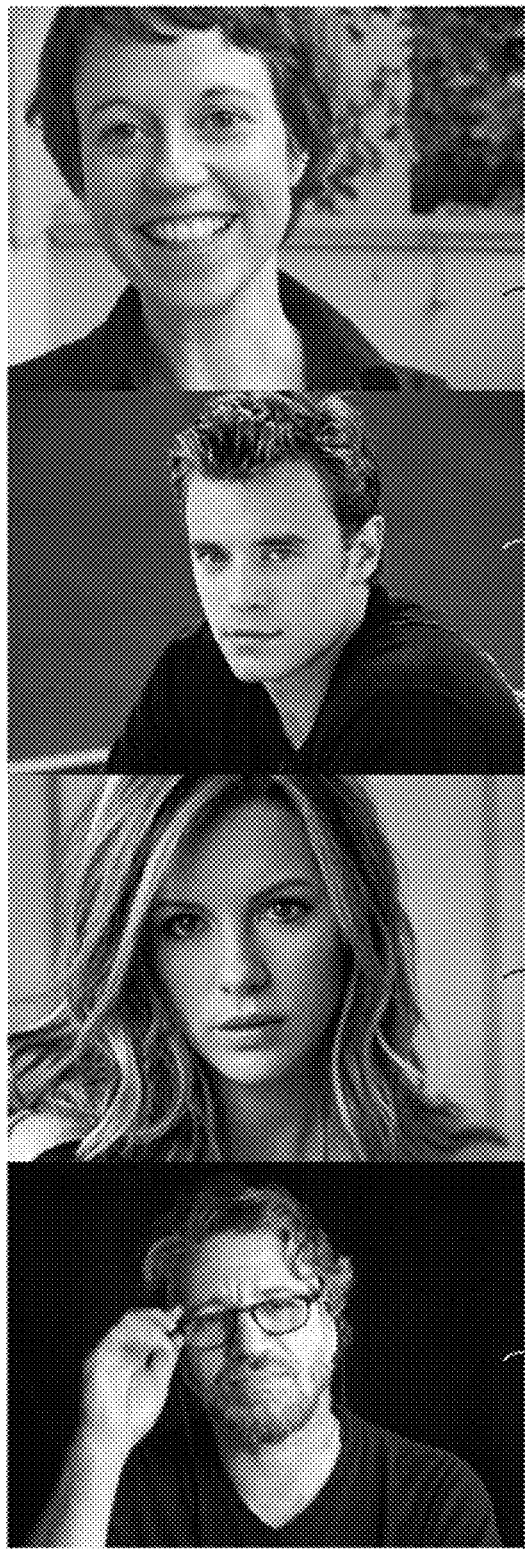
FIG. 3 and FIG. 4 are diagrams showing examples of a composite image received from a multi-party video call control server according to an exemplary embodiment of the present disclosure.
Figure 4:
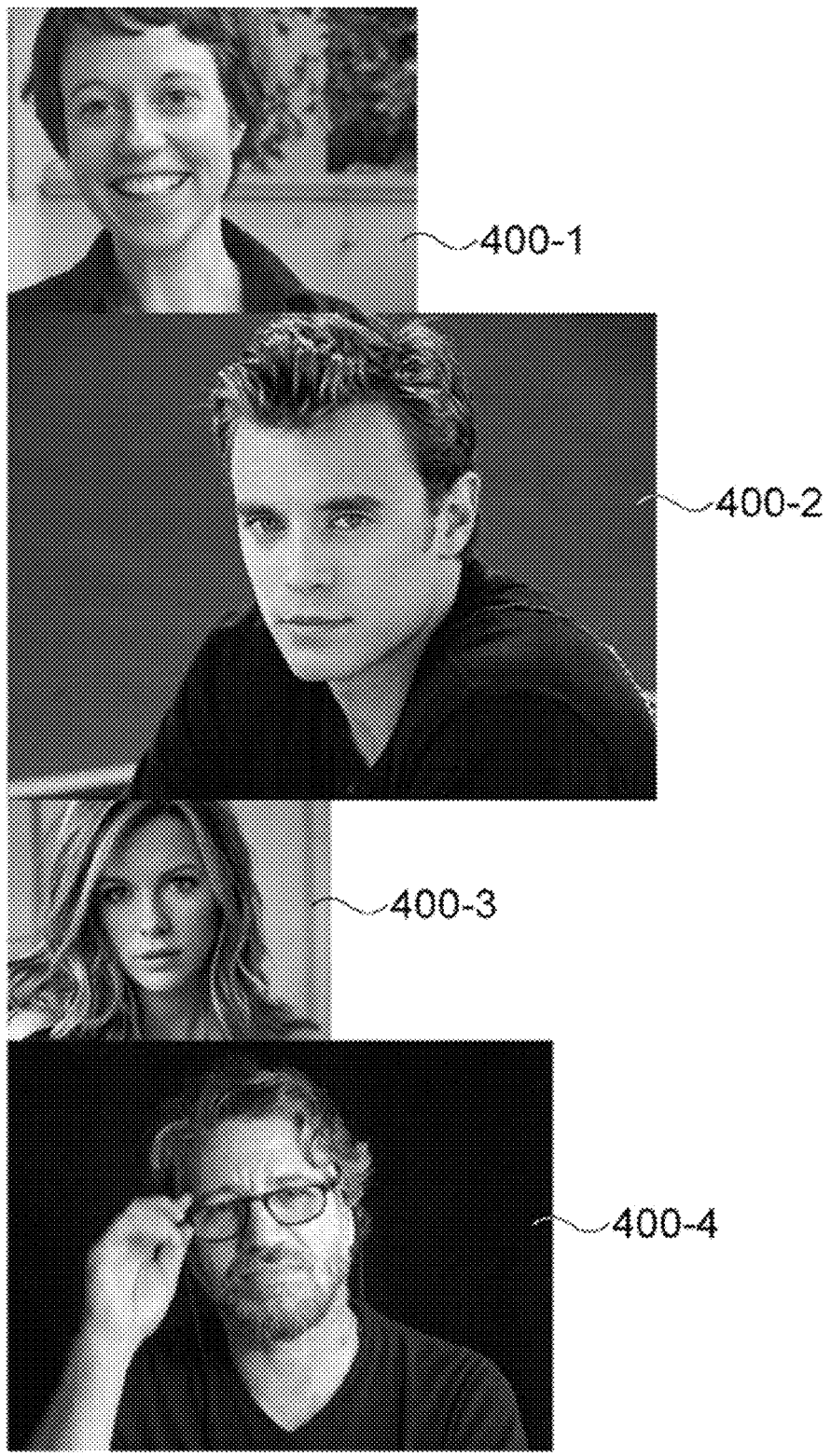

FIG. 3 and FIG. 4 are diagrams showing examples of a composite image received from a multi-party video call control server according to an exemplary embodiment of the present disclosure. As shown in FIG. 3, in an exemplary embodiment of the present disclosure, a composite image may be configured such that images of respective video call participants having the same resolution are successively arranged in one direction. The drawing shows an example of a composite image 300 in which images 300-1, 300-2, 300-3, and 300-4 of four participants having the same resolution are successively connected. Here, sizes of the respective images constituting the composite image 300 may have been known to the video call terminal 104 in advance, or the multi-party video call control server 102 may send size information on the respective images to the video call terminal 104 before or after transmission of the composite image 300 or together with the composite image 300. The sizes of the images may be used as address values when the video call terminal 104 separates the respective images. In other words, the number of bits constituting each image varies according to the size of the image, and an address of a memory area in which the image is stored also varies according to the number of bits. Thus, the video call terminal 104 may calculate an address of a memory area in which each image is stored using the size information.

Meanwhile, as shown in FIG. 4, images of respective participants included in a composite image may have different resolutions. For example, the respective images included in the composite image may be combined in proportion to resolutions of images received from the video call terminals 104. In this case, the receiver module 200 separately receives resolution information on the respective images combined into the composite image from the multi-party video call control server 102 to separate the images of the respective participants from the composite image.

As mentioned above, sizes of the respective images constituting the composite image may have been known to the video call terminal 104 in advance, or the multi-party video call control server 102 may send size information on the respective images to the video call terminal 104 before or after transmission of the composite image or together with the composite image. Also, as mentioned above, the sizes of the images may be used as address values when the video call terminal 104 separates the respective images.

Next, the image separating module 202 separates images of the respective multi-party video call participants from the composite image received by the receiver module 200. For example, the image separating module 202 may receive a composite image consisting of a plurality of RTP packets, combine the received RTP packets, and then decode the composite image using a video decoder, but the present disclosure is not limited to a specific image receiving method. After that, the image separating module 202 stores the decoded composite image data in a memory area. Here, the memory area is a temporary memory buffer, and the image separating module 202 may assign a temporary memory buffer of appropriate capacity in advance according to resolution information on the respective images constituting the composite image and store the decoded composite image in the assigned temporary memory buffer. Needless to say, the present disclosure is not limited to a specific image receiving method, and may be implemented using various methods other than the aforementioned method.

Figure 5:
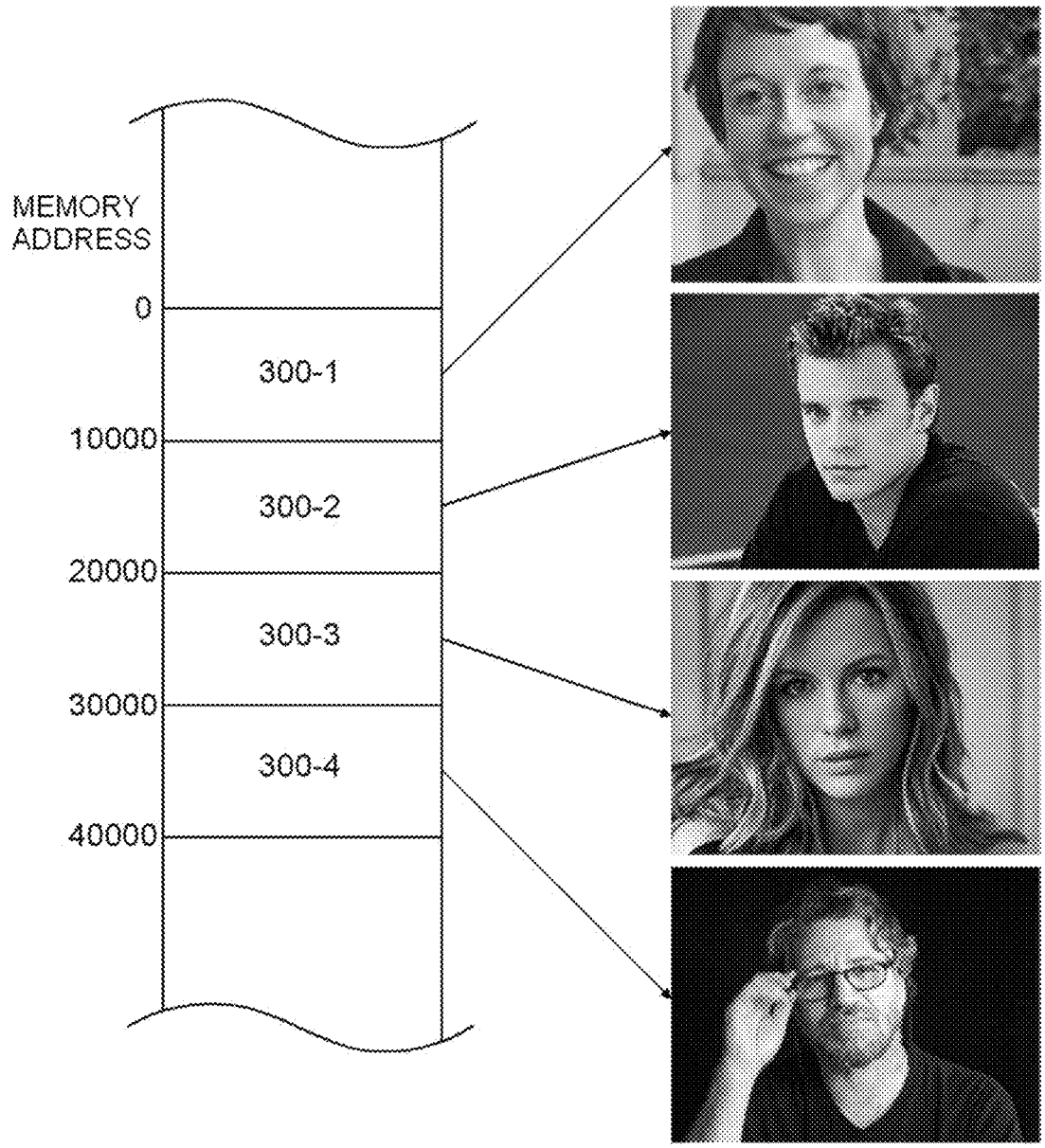
FIG. 5 is a diagram illustrating an image separating process of an image separating module when respective images of participants included in a composite image have the same resolution.

When the respective images included in the composite image 300 have the same resolution as shown in FIG. 3, the images of respective participants included in the received composite image 300 occupy the same capacity in the composite image 300. FIG. 5 is a diagram illustrating an image separating process of an image separating module when respective images of participants included in a composite image have the same resolution as mentioned above. As shown in the drawing, when the composite image 300 of FIG. 3 is stored in a memory area 500 of a video call terminal 104, the respective images of the four participants included in the composite image 300 sequentially occupy the same capacity in the memory area 500. In other words, the first image 300-1, the second image 300-2, the third image 300-3, and the fourth image 300-4 occupy addresses of 1 to 10000, addresses of 10001 to 20000, addresses of 20001 to 30000, and addresses of 30001 to 40000 respectively, and thus the image separating module 202 separates the images of the respective multi-party video call participants using information on the addresses of the memory area 500 in which the composite image 300 is stored. Meanwhile, as mentioned above, when respective images have different resolutions, the image separating module 202 separates the images of respective participants from a composite image according to resolution information on the respective images received separately from the composite image. For example, the image separating module 202 repeats a method of separating an area corresponding to a resolution of a received first image from the left uppermost corner of the composite image, and separating an area corresponding to a resolution of a received second image from the left uppermost corner of the remaining image, thereby separating the images of the respective participants.

Figure 6A:
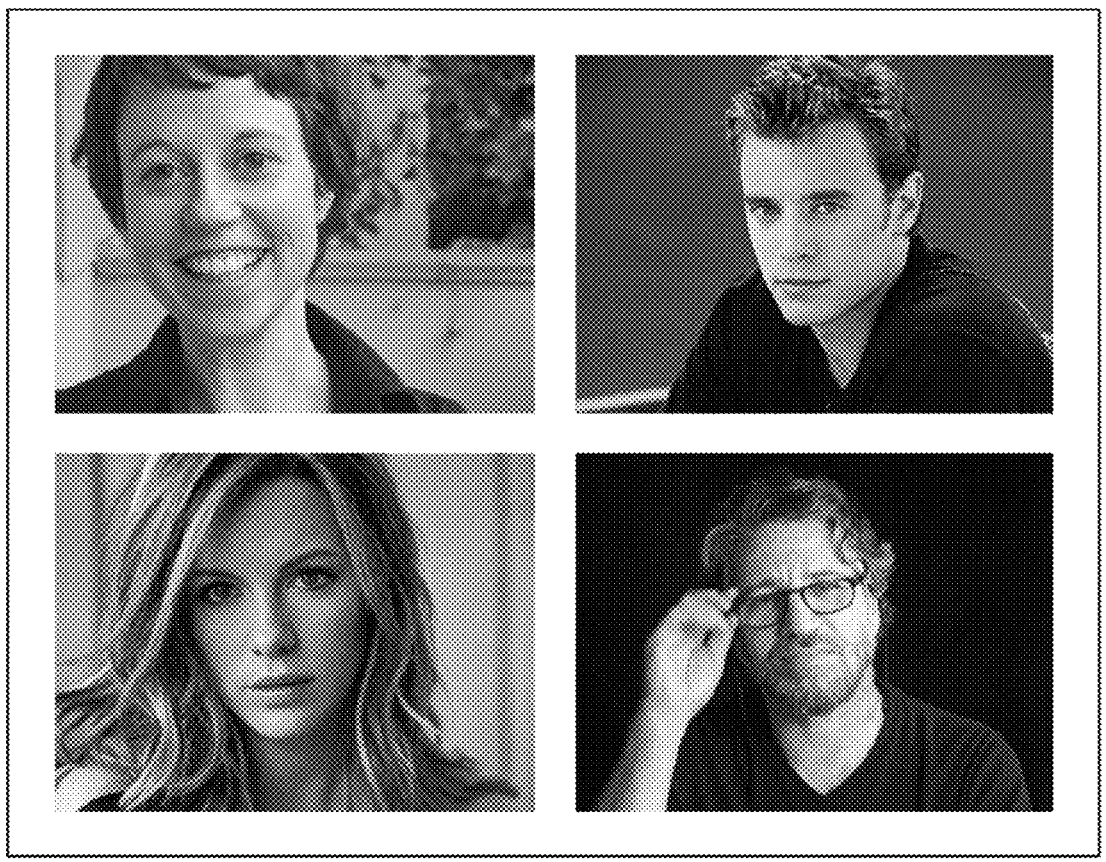
FIGS. 6a and 6b are diagrams illustrating a layout of a video call screen by way of example.
Figure 6B:

Next, the display module 204 arranges the separated images according to a predetermined layout, and displays the separated images on a screen. The display module 204 may display the images in various forms according to settings of a user of the video call terminal 104. For example, the images may be arranged in the same size on the screen as shown in FIG. 6A, or the image of a specific participant may be displayed in a larger size than other participants as shown in FIG. 6B. In addition, according to a setting or manipulation of the user, it is possible to adjust sizes of displayed images, rotate some images, or adjust a display position of an image. As described above, in exemplary embodiments of the present disclosure, it is possible to display an image of a counterpart on a screen in various ways upon a video call according to the user's need, so that the user's convenience can be remarkably improved.

Meanwhile, in an exemplary embodiment of the present disclosure, participants may be altered during a multi-party video call. In other words, during a multi-party video call, some of participants may hang up the video call, or a new participant may participate in the multi-party video call. This will be described for a case in which all images of respective participants included in a composite image have the same resolution and a case in which images of respective participants have different resolutions.

Figure 7A:
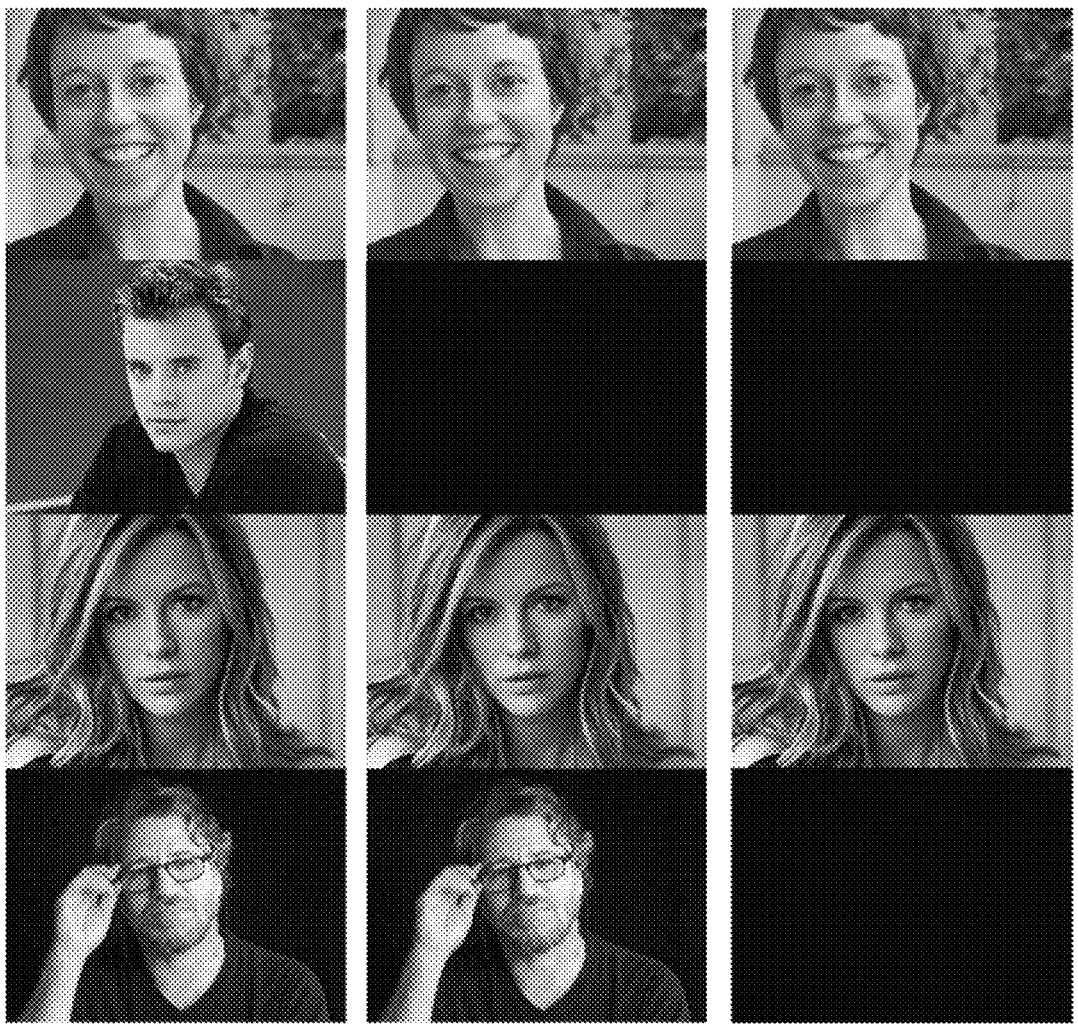
FIG. 7a and FIG. 7b are diagrams illustrating a constitution of a composite image when some participants have dropped out of a video call.

First, the case in which all images of respective participants included in a composite image have the same resolution will be described. For example, it is assumed that during an initial video call among four persons, a second participant and a fourth participant hang up the video call in sequence. In this case, the multi-party video call control server 102 may replace images of the participants who have hung up the video call with replacement images, and transmit the corresponding composite image to the video call terminal 104. At this time, the replacement images may be a monochromatic (e.g., black) screen. FIG. 7A shows examples of such a case. In FIG. 7A, (a) shows a case in which all images of the four participants are combined normally, (b) shows a case in which the second participant has dropped out of the video call, and the corresponding image has been replaced with a black screen, and (c) shows a case in which the fourth participant has additionally dropped out of the video call, and the corresponding image has been replaced with a black screen. Here, the display module 204 may recognize replacement images among respective separated images, and only display the images other than the replacement images on the screen. When the display module 204 is configured in this way, neither of a size of a composite image and positions of respective images in the composite image are changed even if the participants of the multi-party video call are altered. Thus, even when the participants are altered, it is possible to separate respective images from a composite image in the same way, so that the load of the video call terminal 104 can be relieved.

Figure 7B:
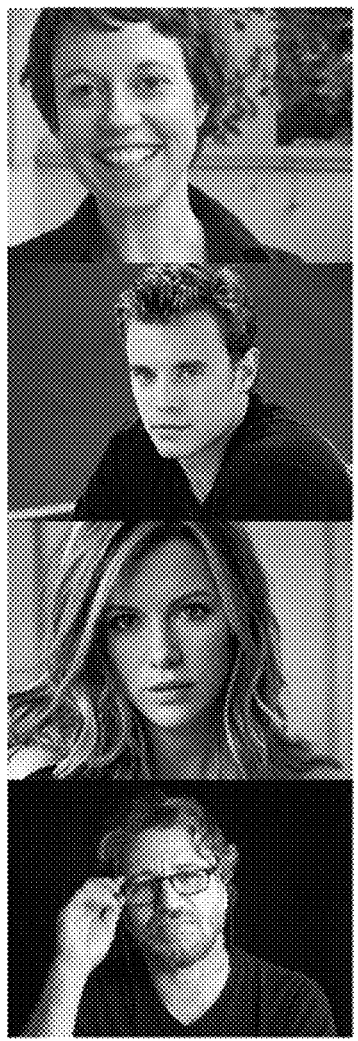
Figure 7B:
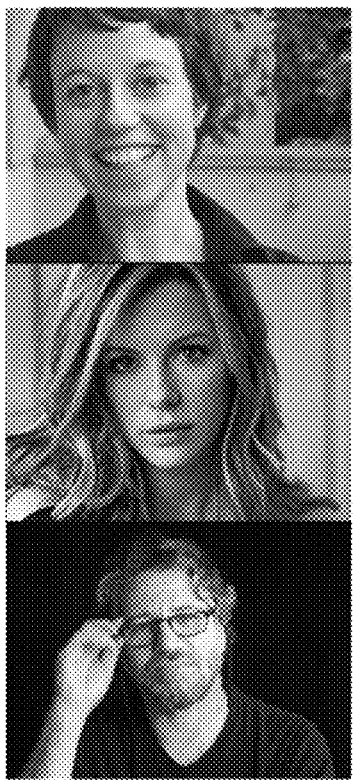
Figure 7B:
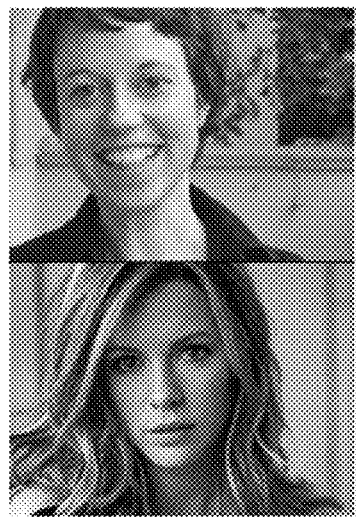

Meanwhile, when some of the participants hang up the video call as mentioned above, the multi-party video call control server 102 may reconfigure the composite image without images of the participants who have hung up the video call. In this case, as the participants hung up the video call, a size of a whole composite image is reduced as shown in FIG. 7B. When a composite image is reconfigured due to withdrawal of some participants in this way, the multi-party video call control server 102 may notify the video call terminal 104 that the composite image has been reconfigured. Alternatively, the video call terminal 104 may be able to sense a change in the capacity of a received composite image and cause the composite image to reflect alterations of some participants.

When a new participant participates in a multi-party video call, the multi-party video call control server 102 reconfigures the composite image to additionally include an image received from the new participant. At this time, the additional image may be added to the end of the composite image. Also, when a participant drops out of the video call and an image of the participant is replaced with a replacement image before the new participant participates in the video call, the additional image may be added to the composite image in replacement of the replacement image. In this case, the video call terminal 104 may sense that the existing replacement image has been replaced with the image of the new participant, and newly configure and display a video call screen including the image of the new participant.

Next, the case in which all images of respective participants included in a composite image have different resolutions will be described. When some participants participating in a multi-party video call hang up the video call, the multi-party video call control server 102 may replace images of the participants who have hung up the video call with a replacement image, or reconfigure the composite image without the images of the participants who have hung up the video call. When the composite image is reconfigured, the multi-party video call control server 102 retransmits resolution information on respective images in the reconfigured composite image to the video call terminal 104.

When a new participant participates in a multi-party video call, the multi-party video call control server 102 reconfigures the composite image to additionally include an image received from the new participant. At this time, the additional image may be added to the end of the composite image. Also, when a participant drops out of the video call and an image of the participant is replaced with a replacement image before the new participant participates in the video call, the additional image may be added to the composite image in replacement of the replacement image. In this case, the additional image may be added to the composite image in replacement of the replacement image if the additional image has the same or lower resolution than the replacement image.

On the other hand, when the additional image has higher resolution than the replacement image, the additional image may be added to the end of the existing composite image, or the whole image including the added image may be reconfigured according to an exemplary embodiment.

Figure 8:
FIG. 8 is a diagram illustrating an example of the layout of a video call screen to which identifiers (IDs) of respective participants are added.

Meanwhile, in an exemplary embodiment of the present disclosure, the receiver module 200 may additionally receive identification information (identifiers (IDs), names, etc.) on respective participants of a multi-party video call and information on an arrangement order of the respective participants in a composite image from the multi-party video call control server 102 together with the composite image, and the display module 204 may match the identification information on the respective participants with separated images according to the received arrangement order, and display the images with the matched identification information on the screen. For example, it is assumed that IDs of the respective participants shown in FIG. 3 are as follows:

First image 300-1: Grace
Second image 300-2: Brad
Third image 300-3: Kate
Fourth image 300-4: John When the receiver module 200 receives information on the respective IDs and matching information between the respective IDs and the images, the display module 204 may display the ID information matching with the respective images together as shown in FIG. 8.

At this time, when a self-hide function has been set by the user of the video call terminal 104, the display module 204 may identify an image corresponding to the user of the terminal 104 using the identification information, and only display the images other than the corresponding image on the screen. This is because it is not absolutely necessary to display the image of the user on the screen.

Meanwhile, when a participant joins or drops out of the multi-party video call, the receiver module 200 may receive changed participant identification information and information on an arrangement order in a composite image from the multi-party video call control server 102. Likewise, when an arrangement order of images in a composite image from the multi-party video call control server 102 is changed, the receiver module 200 may also receive information on the changed image arrangement order from the multi-party video call control server 102 and cause the composite image to reflect the changed image arrangement order.

In addition, the receiver module 200 may additionally receive identification information on a video call participant who is currently speaking from the multi-party video call control server 102. In this case, the display module 204 may display separated images on the screen such that an image of the video call participant who is currently speaking is visually emphasized among the separated images. For example, the display module 204 may visually emphasize the image of the video call participant who is currently speaking by displaying the image in a greater size than other images, displaying the outline of the image in a different color than that of other images, or so on.

Figure 9:
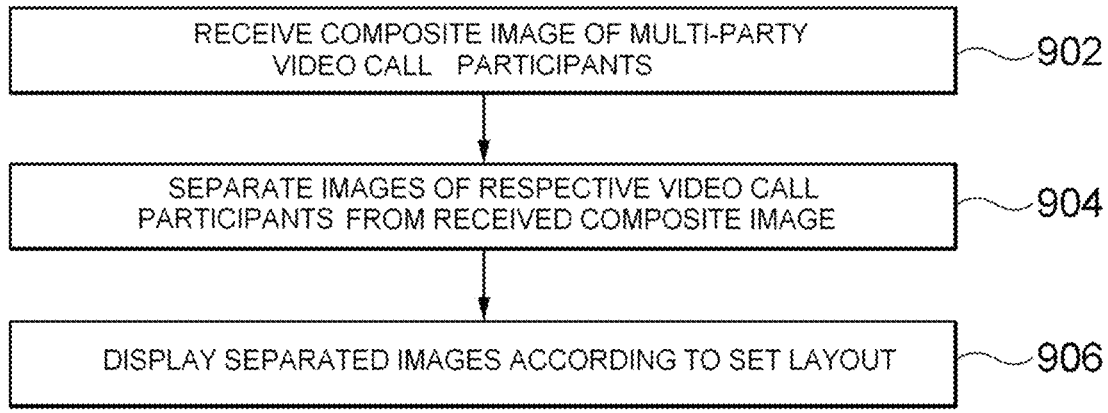
FIG. 9 is a flowchart illustrating a method of displaying a multi-party image according to an exemplary embodiment of the present disclosure.

FIG. 9 is a flowchart illustrating a method of displaying a multi-party image according to an exemplary embodiment of the present disclosure. First, a receiver module 200 of a video call terminal 104 receives a composite image of multi-party video call participants from a multi-party video call control server 102 (902).

Next, an image separating module 202 of the video call terminal 104 separates images of the respective multi-party video call participants from the composite image received by the receiver module 200 (904).

At this time, when the composite image is configured such that the images of the respective video call participants having the same resolution are successively arranged in one direction, the image separating module 202 may separate the images of the respective multi-party video call participants using address information on a memory area in which the received composite image is stored as described above.

On the other hand, when the images included in the composite image have different resolutions, the receiver module 200 may receive resolution information on the respective images of the respective participants combined into the composite image from the multi-party video call control server 102 together in step 902. In this case, the image separating module 202 may separate the images of the respective multi-party video call participants from the composite image according to the resolution information received in step 902.

Also, in step 902, the receiver module 200 may additionally receive identification information on the respective multi-party video call participants and information on an arrangement order of the respective participants in the composite image from the multi-party video call control server 102. In this case, when a participant joins or drops out of the multi-party video call, the receiver module 200 may receive changed participant identification information and information on an arrangement order in a composite image from the multi-party video call control server 102 again.

Next, a display module 204 of the video call terminal 104 arranges the separated images according to a predetermined layout and displays the separated images on a screen (906).

At this time, when a replacement image of a participant who has dropped out of the video call is included in the images separated in step 904, the display module 204 may only display the images other than the replacement image on the screen.

Also, when the arrangement order of the images in the composite image and the identification information on the respective images have been received, the display module 204 may match the identification information with the separated images according to the received arrangement order, and display the separated images with the matched identification information on the screen. In case of need, the display module 204 may display the images other than an image of a user of the video call terminal 104 (self-hide mode).

In step 902, identification information on a video call participant who is currently speaking may be additionally received from the multi-party video call control server 102. In this case, the separated images may be displayed on the screen in step 906 such that an image of the video call participant who is currently speaking is visually emphasized among the separated images.

Figure 10:
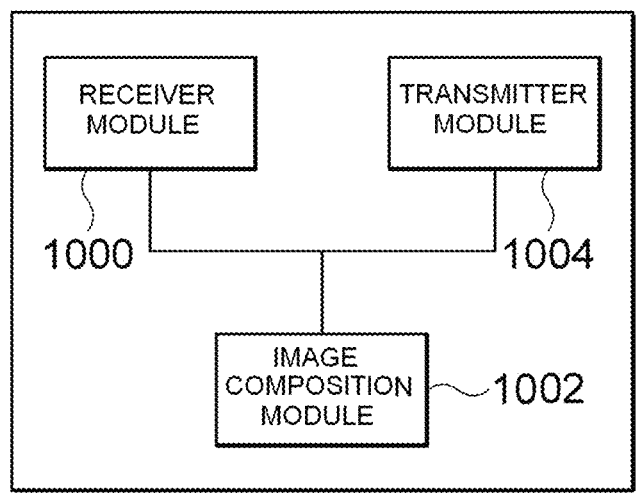
FIG. 10 is a block diagram showing a detailed constitution of a server for controlling a multi-party video call according to an exemplary embodiment of the present disclosure.

FIG. 10 is a block diagram showing a detailed constitution of a multi-party video call control server according to an exemplary embodiment of the present disclosure. As shown in the drawing, a multi-party video call control server 102 according to an exemplary embodiment of the present disclosure includes a receiver module 1000, an image composition module 1002, and a transmitter module 1004.

The receiver module 1000 receives images of respective video call participants from a plurality of video call terminals 104 participating in a multi-party video call. The image composition module 1002 generates a composite image from the images received from the respective video call terminals 104. Then, the transmitter module 1004 transmits the composite image generated by the image composition module 1002 to the respective video call terminals 104.

The image composition module 1002 may generate the composite image in which the received images are successively arranged in one direction. In this case, when the images of the respective participants included in the composite image have different resolutions, the transmitter module 1004 may transmit resolution information on the images of the respective participants combined into the composite image to the respective video call terminals 104 together with the composite image. Here, sizes of the respective images constituting the composite image may have been known to the video call terminals 104 in advance, or the multi-party video call control server 102 may send size information on the respective images to the video call terminals 104 before or after transmission of the composite image or together with the composite image.

When at least one of the video call terminals 104 participating in the multi-party video call hangs up the multi-party video call, the image composition module 1002 may replace an image received from the video call terminal that has hung up the video call with a replacement image. When a new video call terminal participates in the multi-party video call after the withdrawal, the image composition module 1002 may replace the replacement image included in the composite image with an image added from the newly participating video call terminal. However, when the respective images included in the composite image have different resolutions, the image composition module 1002 may determine whether or not the replacement image and the added image have the same resolution first, and replace the replacement image with the added image when the added image has the same or lower resolution than the replacement image. Unlike this, it is also possible to add the newly added image to the end of the composite image according to a resolution of the newly added image as described above. Alternatively, in case of need, the whole composite image including the added image may be reconfigured.

In addition, when at least one of the video call terminals 104 participating in the multi-party video call drops out of the multi-party video call, or a new video call terminal is added, the image composition module 1002 may reconfigure the composite image to reflect the withdrawal or addition.

Meanwhile, the receiver module 1000 may additionally receive identification information on the respective video call participants from the plurality of video call terminals 104, and the transmitter module 1004 may transmit the received identification information on the respective multi-party video call participants and information on an arrangement order of the respective participants in the composite image to the respective video call terminals 104. In this case, when a participant joins or drops out of the multi-party video call, the transmitter module 1004 transmits changed participant identification information and information on an arrangement order in a composite image to the respective video call terminals 104. Likewise, when the arrangement order of the respective multi-party video call participants in the composite image is changed, the transmitter module 1004 also transmits information on the changed image arrangement order to the respective video call terminals 104. In addition, an image to be added may be added by converting a resolution of the image into that of an image of a withdrawer, and a whole composite image may be reconfigured using resolution information on images of a withdrawer and participants.

Meanwhile, an exemplary embodiment of the present disclosure may include a computer-readable recording medium including a program for performing the methods described herein on a computer. The computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. A computer, such as the one mentioned above, is very familiar to those who practice in these technical arts. Therefore, the discussion herein has avoided obscuring the key features of the exemplary embodiments by purposefully omitting details concerning the manner in which a hardware processor of such a computer system uses the above-identified computer-readable codes and data storage device to carry out the various functions or implement the various units previously mentioned. Likewise, since a person familiar with this field understands that such functions and units may be implemented through various combinations of hardware and/or software, such implementation details are likewise omitted.

In exemplary embodiments of the present disclosure, the layout of a conversation screen of a video call terminal can be diversified for a multi-party video call according to characteristics of the terminal, a user's need, and so on.

It will be apparent to those skilled in the art that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. An apparatus for a multi-party video call, comprising:
  a receiver module configured to receive a composite image of multi-party video call participants and resolution information on respective images of the composite image from a server;
  an image separating module configured to separate respective images of the multi-party video call participants from the composite image using the resolution information;
  a display module configured to arrange the separated respective images according to a predetermined layout and display the separated images on a screen; and
  a hardware processor to implement one or more of the receiver module, the image separating module, and the display module.

2. The apparatus of claim 1, wherein, within the composite image, the respective images of the video call participants are successively arranged in only one direction.

3. The apparatus of claim 2, further comprising a memory area storing the composite image, wherein the image separating module separates the respective images of the multi-party video call participants using address information of the memory area.

4. The apparatus of claim 1, wherein the display module is further configured to respond to a user input by performing one or more operations with respect to at least one of the separated respective images, the one or more operations including a rotation operation, a resizing operation, and a repositioning operation.

5. The apparatus of claim 1, wherein the display module is further configured to respond to an indication that a replacement image is included among the separated respective images by displaying on the screen only ones of the separated respective images other than the replacement image.

6. The apparatus of claim 1, wherein:
  the receiver module is further configured to receive identification information on and an arrangement order of the multi-party video call participants within the composite image, and
  the display module is further configured to match the identification information with the separated respective images according to the arrangement order, and to display on the screen the separated respective images with the matched identification information.

7. The apparatus of claim 6, wherein the receiver module is further configured to receive from the server and store changed participant information and information on as now amended changed arrangement order in a composite image.

8. The apparatus of claim 6, wherein:
the receiver module is further configured to receive identification information from the server indicating a currently speaking participant of the multi-party video call participants; and
the display module is further configured to respond to an indication of the currently speaking participant by visually emphasizing one of the separated respective images corresponding to the currently speaking participant.

9. A server for controlling a multi-party video call, comprising:
a receiver module configured to receive respective images of video call participants from a plurality of video call terminals participating in a multi-party video call;
an image composition module configured to generate a composite image from the respective images received from the video call terminals;
a transmitter module configured to transmit to the video call terminals the composite image; and
a hardware processor to implement one or more of the receiver module, the image composition module, and the transmitter module,
wherein the transmitter module responds, to an indication that the participants included in the composite image have different respective resolutions, by transmitting to the video call terminals resolution information on the respective images.

10. The server of claim 9, wherein the image composition module is further configured to generate the composite image by arranging the received respective images in only one direction.

11. The server of claim 10, wherein:
the receiver module is further configured to receive respective identification information on the video call participants from the plurality of video call terminals; and
the transmitter module is further configured to transmit to the video call terminals the received identification information, and information on an arrangement order of the respective participants in the composite image, to the video call terminals.

12. The server of claim 11, wherein the transmitter module is further configured to respond, to an indication that a given participant joins or drops out of the multi-party video call, by transmitting to the respective video call terminals changed participant identification information and changed information on the arrangement order.

13. The server of claim 9, wherein the image composition module is further configured to respond, to an indication that at least one of the video call terminals participating in the multi-party video call drops from the multi-party video call, by replacing the corresponding respective image received with a replacement image.

14. The server of claim 9, wherein the image composition module is further configured to respond, to an indication that a new video call terminal participates in the multi-party video call by replacing the replacement image with an added image from the newly participating video call terminal.

15. The server of claim 14, wherein the image composition module is further configured to replace the replacement image with the added image in response to an indication that the replacement image and the added image have the same resolution.

16. The server of claim 9, wherein:
the image composition module is further configured to respond to an indication that a given one of the video call terminals participating in the multi-party video call drops out of the multi-party video call by reconfiguring the composite image to exclude the respective image of the given one of the video call terminals; and
the image composition module is further configured to respond to an indication that a new video call terminal is added by reconfiguring the composite image to include the respective image of the new video call terminal.

17. A method of displaying a multi-party image, for a video call terminal, comprising:
receiving, from a server, a composite image of multi-party video call participants and resolution information on respective images of the video call participants;
separating, at an image separating module, respective images of the multi-party video call participants from the composite image using the resolution information;
arranging, at a display module, the separated respective images according to a predetermined layout; and
displaying the separated respective images on a screen;
wherein one or more of the receiving, separating, arranging, and displaying are implemented with a hardware processor.

18. The method of claim 17, wherein, within the composite image, the respective images of the video call participants have the same resolution and are successively arranged in only one direction.

19. The method of claim 18, further comprising storing the composite image in a memory area, wherein the separating of the respective images is performed using address information of the memory area.

20. The method of claim 17, wherein:
the displaying of the separated respective images further includes responding to a user input by performing one or more operations with respect to at least one of the separated respective images; and
the one or more operations include a rotation operation, a resizing operation, and a repositioning operation.

21. The method of claim 17, further comprising responding, to an indication that a replacement image is included among the separated respective images, by displaying on the screen only ones of the separated respective images other than the replacement image.

22. The method of claim 17, wherein:
the receiving of the composite image further includes receiving identification information on the multi-party video call participants;
the receiving of the composite image further includes receiving arrangement information on an arrangement order of the multi-party video call participants within the composite image; and
the displaying of the separated respective images includes matching the identification information with the separated respective images according to the arrangement order and displaying on the screen the separated respective images with the matched identification information.

23. The method of claim 22, wherein the receiving of the composite image further includes receiving changed participant identification information and changed arrangement order information indicating that a participant joins or drops out of the multi-party video call.

24. The method of claim 22, wherein:
the receiving of the composite image further includes receiving identification information indicating a currently speaking call participant of the multi-party video call participants; and
the displaying of the separated images further includes visually emphasizing one of the separated respective images corresponding to the currently speaking participant.

25. A non-transitory computer-readable recording medium storing a program for enabling a hardware processor of a computer to implement operations to:
  receive, from a server, a composite image of multi-party video call participants and resolution information on respective images of the video call participants;
  separate, at an image separating module, respective images of the multi-party video call participants from the composite image using the resolution information;
  arrange, at a display module, the separated respective images according to a predetermined layout; and
  display the separated respective images on a screen.

* * * * *